United States Patent
Sung

(10) Patent No.: US 7,850,109 B2
(45) Date of Patent: Dec. 14, 2010

(54) DEVICE FOR PREVENTING BACKLASH ON SPOOL OF BAIT REEL

(75) Inventor: Ki-Mo Sung, Bucheon-si (KR)

(73) Assignee: Dawon Eng Co., Ltd. (KR)

( * ) Notice: Subject to any disclaimer, the term of this patent is extended or adjusted under 35 U.S.C. 154(b) by 0 days.

(21) Appl. No.: 12/369,737

(22) Filed: Feb. 11, 2009

(65) Prior Publication Data
US 2009/0206188 A1  Aug. 20, 2009

(30) Foreign Application Priority Data
Feb. 14, 2008 (KR) ............ 10-2008-0013450

(51) Int. Cl.
*A01K 89/02* (2006.01)
(52) U.S. Cl. ............... 242/288; 242/286
(58) Field of Classification Search ......... 242/286, 242/288, 289
See application file for complete search history.

(56) References Cited

U.S. PATENT DOCUMENTS

| | | | | |
|---|---|---|---|---|
| 4,601,438 A | * | 7/1986 | Young | 242/289 |
| 5,636,804 A | * | 6/1997 | Jeung | 242/288 |
| 5,749,534 A | * | 5/1998 | Morimoto | 242/288 |
| 6,065,700 A | * | 5/2000 | Kim | 242/288 |
| 6,126,105 A | * | 10/2000 | Yamaguchi | 242/288 |
| 6,206,311 B1 | * | 3/2001 | Kim et al. | 242/288 |
| 6,422,498 B1 | * | 7/2002 | Littau et al. | 242/288 |
| 6,964,387 B2 | * | 11/2005 | Hyun | 242/288 |
| 6,983,907 B2 | * | 1/2006 | Ikuta et al. | 242/288 |
| 2005/0178869 A1 | * | 8/2005 | Hyun | 242/288 |

FOREIGN PATENT DOCUMENTS

JP  2003-189771  7/2003

* cited by examiner

*Primary Examiner*—Evan H Langdon
(74) *Attorney, Agent, or Firm*—Brooks Kushman P.C.

(57) ABSTRACT

The present invention relates to a device for preventing backlash on a spool of a bait reel, including: the spool fit to a spool shaft in such a manner as to be rotated together with the spool shaft; a dial knob mounted at the outside of a body of the bait reel and having a cam mounted at the inside thereof; and magnetic braking means including: a ring-shaped face plate moved forwardly and backwardly in a coaxial direction to the spool shaft by the rotation of the cam of the dial knob rotatably mounted at the inside of a spool cover covering the side face of the body of the bait reel; and a pair of movers mounted on one end surface of the spool to face each other about the spool shaft in such a manner as to be slidingly moved in a radial direction, each of the pair of movers having a plurality of magnets mounted therein.

4 Claims, 7 Drawing Sheets

DEVICE FOR PREVENTING BACKLASH ON SPOOL OF BAIT REEL

BACKGROUND OF THE INVENTION

1. Field of the Invention

The present invention relates to a device for preventing backlash on a spool of a bait reel that is operated cooperatively and proportionally according to the variation of the rotary force of the spool when a fishing line wound on the spool of the bait reel is cast in the water, such that if the rotary force of the spool is a predetermined value or less, a braking force is removed, thereby achieving the expansion of distance and preventing the backlash from occurring on the spool.

2. Background of the Related Art

Generally, a device for preventing the backlash on a spool of a bait reel for fishing is largely classified into a frictional brake using a centrifugal force and a magnet brake using magnets. In this case, the frictional brake using the centrifugal force exerts a maximum rotary force at an initial step of casting and exhibits a gradually reduced rotary force, while frictionally coming into close contact with a brake ring. Thus, the number of rotations is decreased and the braking force is reduced, thereby being more advantageous in long distance casting than the magnet brake. However, it is difficult to perform fine adjustment, and further, abrasion and noise occur due to the friction between a brake shoe and a brake ring.

SUMMARY OF THE INVENTION

Accordingly, the present invention has been made in view of the above-mentioned problems occurring in the prior art, and it is an object of the present invention to provide a device for preventing backlash on a spool of a bait reel that includes a ring-shaped face plate adapted to be moved forwardly and backwardly in a coaxial direction to a spool shaft by the rotation of a cam disposed at the inside of a spool cover mounted on the side of a body of the bait reel having the spool fit to the spool shaft in such a manner as to be rotated together with the spool shaft, and a pair of movers mounted on one end surface of the spool facing the ring-shaped face plate in such a manner as to be slidingly moved opposed to each other about the spool shaft, each of the pair of movers having a plurality of magnets mounted therein.

To accomplish the above object, according to the present invention, there is provided a device for preventing backlash on a spool of a bait reel including: the spool fit to a spool shaft in such a manner as to be rotated together with the spool shaft; a dial knob mounted at the outside of a body of the bait reel and having a cam mounted at the inside thereof; and magnetic braking means including: a ring-shaped face plate moved forwardly and backwardly in a coaxial direction to the spool shaft by the rotation of the cam of the dial knob rotatably mounted at the inside of a spool cover covering the side face of the body of the bait reel; and a pair of movers mounted on one end surface of the spool to face each other about the spool shaft in such a manner as to be slidingly moved in a radial direction, each of the pair of movers having a plurality of magnets mounted therein.

According to the present invention, the magnetic braking means includes: a guide block coupled to the spool shaft in such a manner as to be rotated together with the spool and having a pair of movers elastically supported in such a manner as to be slidingly movable along slide grooves formed to face each other in the radial direction about the spool shaft; the ring-shaped face plate disposed at the outside of the guide block in such a manner as to be moved forwardly and backwardly to/from the pair of movers so as to selectively restrict the rotation of the spool on which the pair of movers are disposed, when the pair of movers are moved in the radial direction by the generation of the centrifugal force caused by the rotation thereof; the dial knob having the cam adapted to forwardly and backwardly move the ring-shaped face plate; and a cover block having a plurality of through-holes formed thereon, through which the ring-shaped face plate is coupled in such a manner as to be moved forwardly and backwardly by the cam of the dial knob.

According to the present invention, the ring-shaped face plate is mounted at the outside of the guide block in such a manner as to be moved relative to the pair of movers, and the ring-shaped face plate is moved forwardly and backwardly in the interior of the cylindrical cover block screw-coupled to the spool cover, the ring-shaped face plate having a plurality of driven protrusions formed integrally therewith in such a manner as to be partially contacted with the cam by means of the through-holes of the cover block, thereby being moved forwardly and backwardly by means of the cam of the dial knob rotatably supported on the spool cover.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 7 is a sectional view showing the operation state of the device of the present invention when the rotary force of the spool is strong in FIG. 6a.

DETAILED DESCRIPTION OF THE PREFERRED EMBODIMENT

Hereinafter, an explanation on a device for preventing backlash on a spool of a bait reel according to a preferred embodiment of the present invention will be given with reference to the attached drawings.

Figure 1:
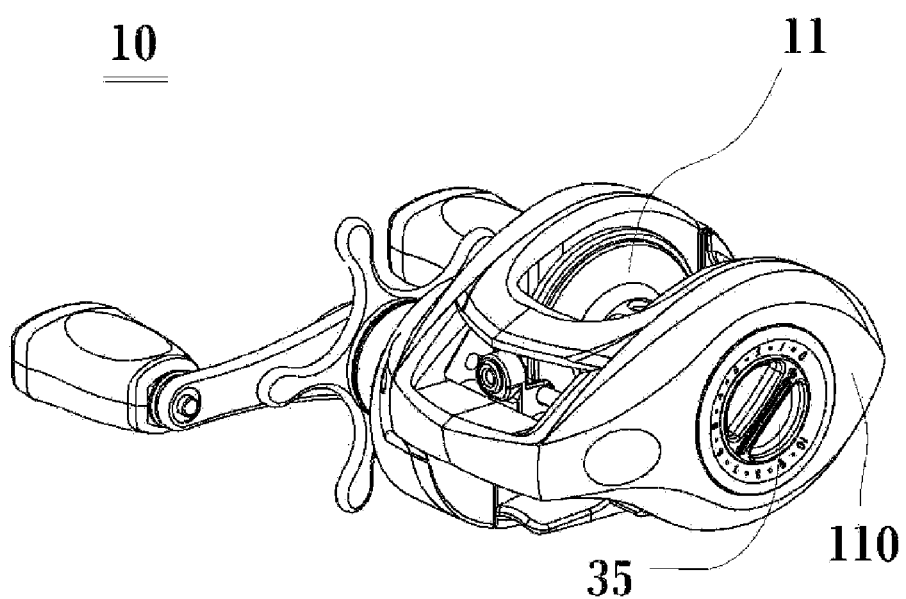
FIG. 1 is a perspective view showing a bait reel applied in the present invention.
Figure 2:
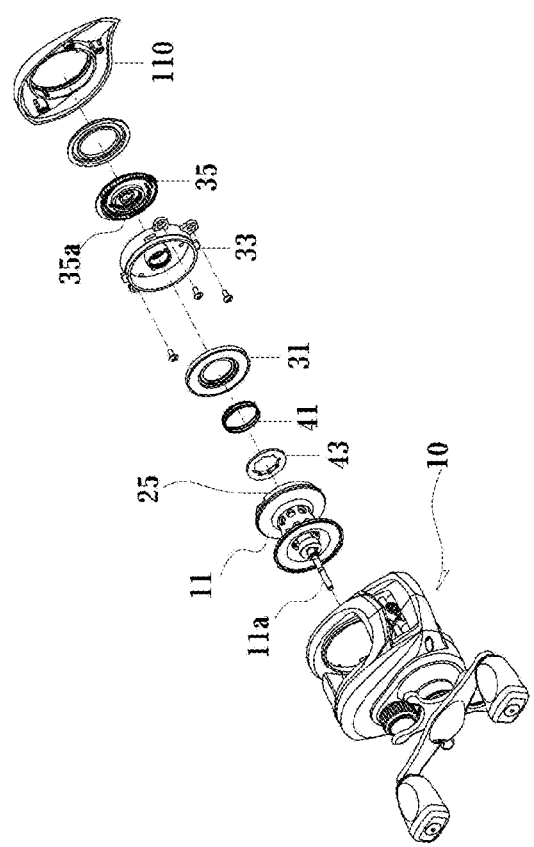
FIG. 2 is an exploded perspective view showing a device for preventing backlash on a spool of a bait reel according to the present invention.
Figure 3:
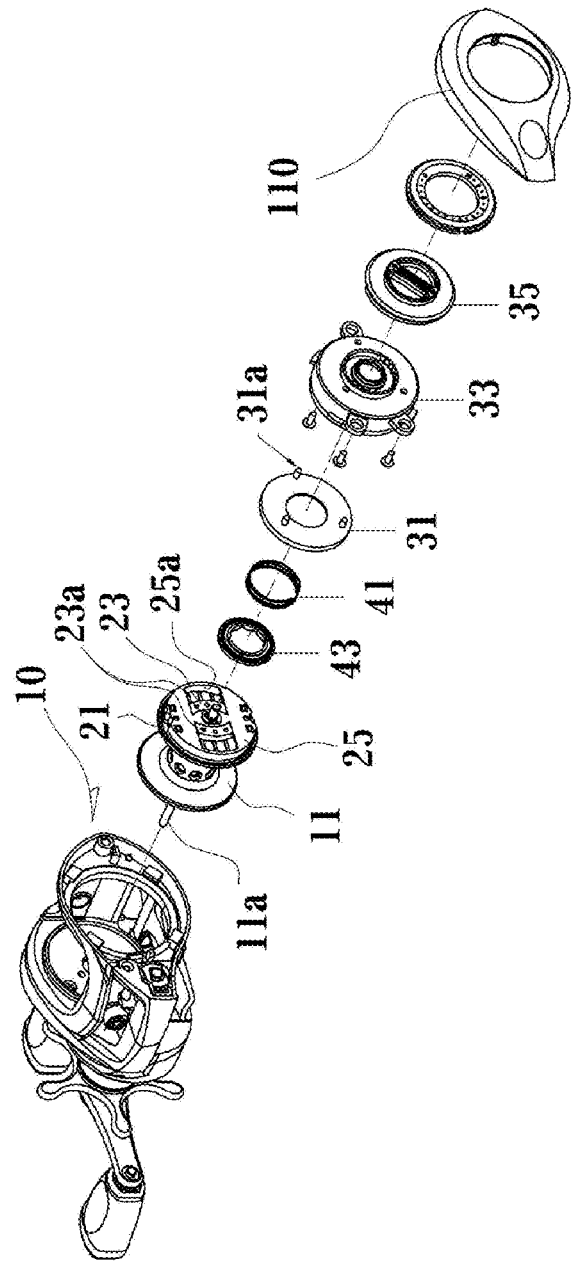
FIG. 3 is an exploded perspective view showing the device for preventing backlash on a spool of a bait reel according to the present invention, which is viewed in the opposite direction to that in FIG. 2.
Figure 4:
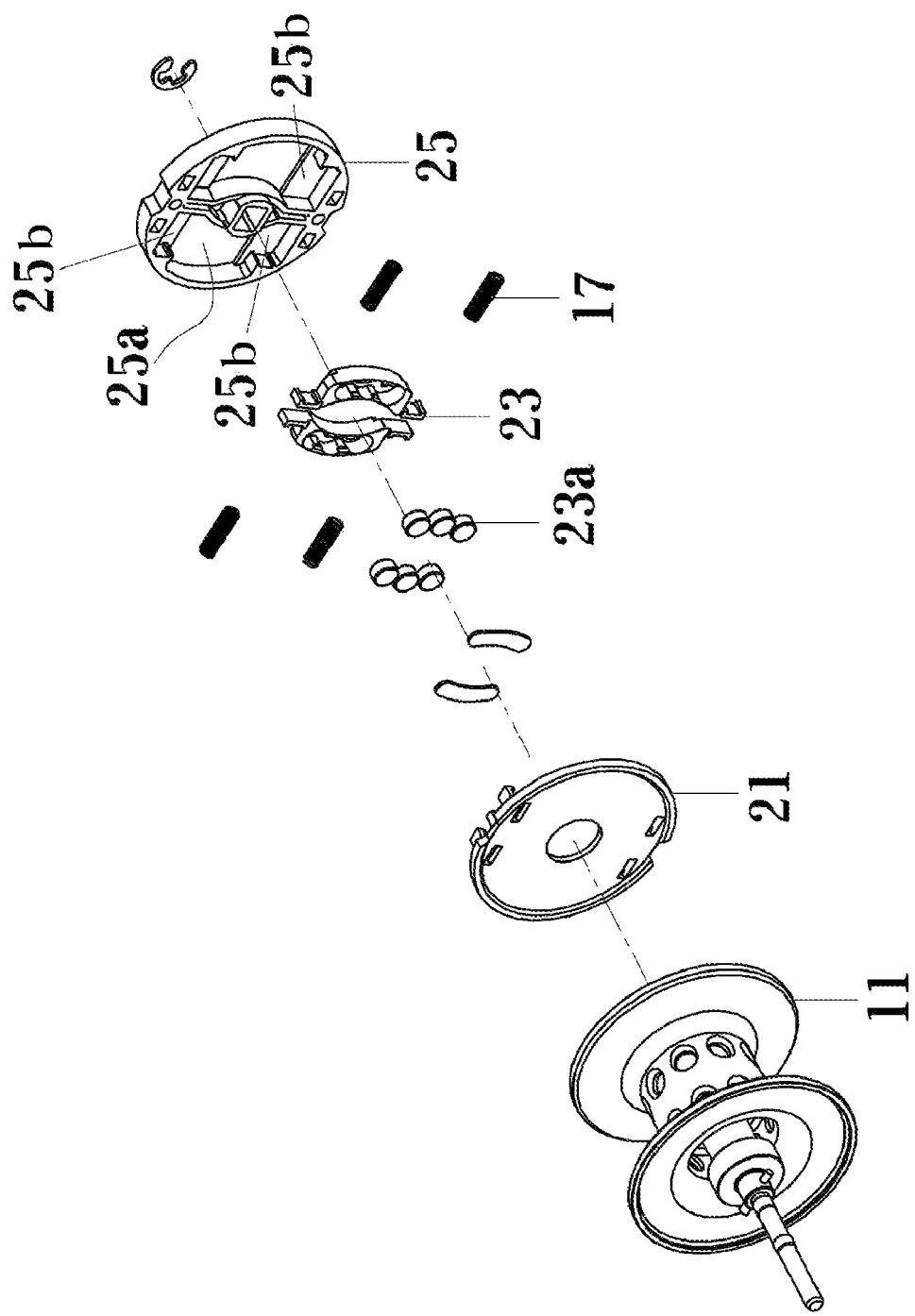
FIG. 4 is an exploded perspective view showing the main components like a spool, a support plate, magnets, a pair of movers and a guide block in the device of the present invention.
Figure 5:
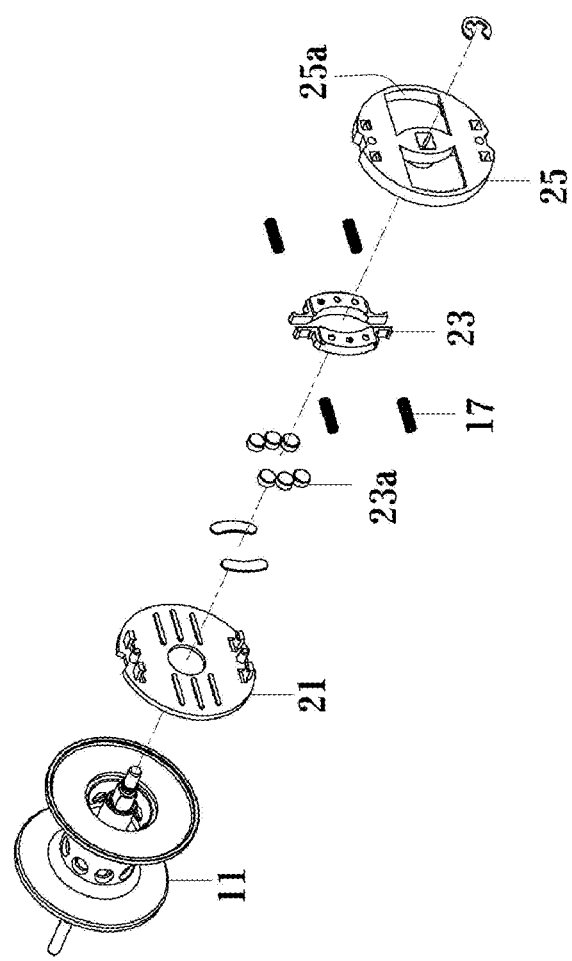
FIG. 5 is an exploded perspective view showing the main components of the device of the present invention, which is viewed in the opposite direction to that in FIG. 4.
Figure 6B:
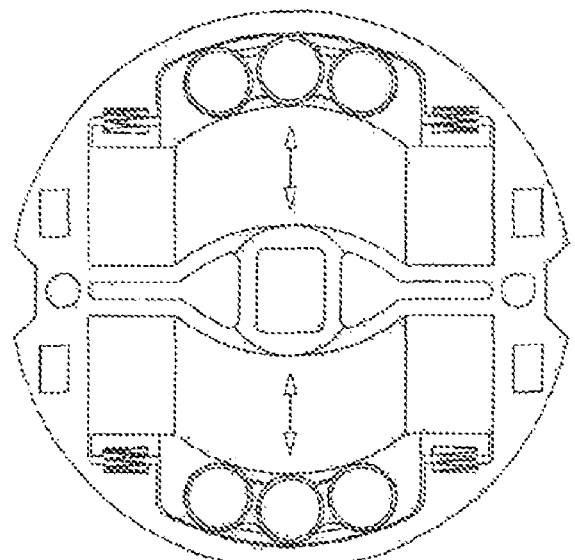
FIGS. 6a and 6b are sectional views showing the operation relations of the pair of movers of the device of the present invention when the rotary force of the spool is strong at the initial step of casting and when it is weak at the finishing step of casting.
Figure 6A:
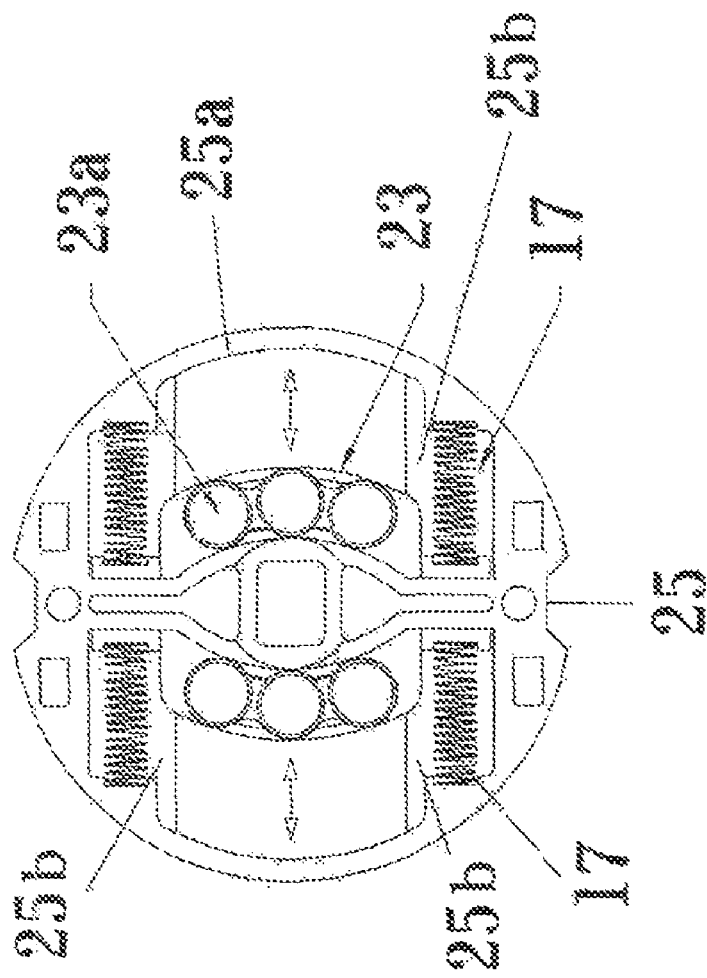
Figure 7:
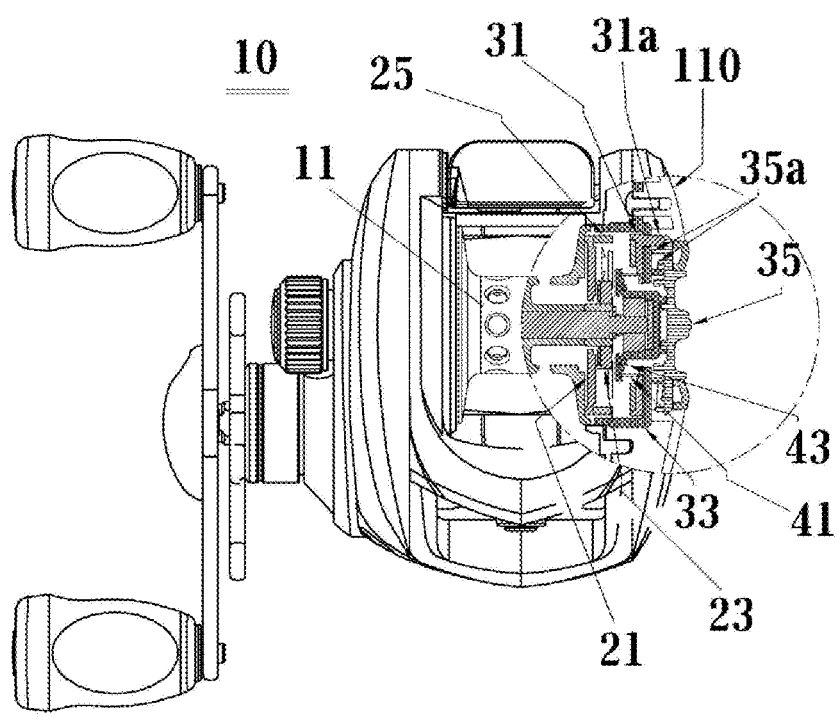

FIG. 1 is a perspective view showing a bait reel applied in the present invention, FIG. 2 is an exploded perspective view showing a device for preventing backlash on a spool of a bait reel according to the present invention, FIG. 3 is an exploded perspective view showing the device for preventing backlash on a spool of a bait reel according to the present invention, which is viewed in the opposite direction to that in FIG. 2, FIG. 4 is an exploded perspective view showing the main components like a spool, a support plate, magnets, a pair of movers and a guide block in the device of the present invention, FIG. 5 is an exploded perspective view showing the main components of the device of the present invention, which is viewed in the opposite direction to that in FIG. 4, FIGS. 6*a* and 6*b* are sectional views showing the operation relations of the pair of movers of the device of the present invention when the rotary force of the spool is strong at the initial step of casting and when it is weak at the finishing step of casting, and FIG. 7 is a sectional view showing the operation state of the device of the present invention when the rotary force of the spool is strong in FIG. 6*a*.

According to the present invention, a device for preventing backlash on a spool of a bait reel includes a spool cover 110 which is separately made for adjusting a drag force of a fishing line being payed out from the spool 11 upon casting for fishing or for protecting the surrounding parts embedded therein from external impacts, the spool cover 110 being fixedly locked onto a side face 13 of a body of a bait reel 10.

According to the present invention, the device for preventing backlash on the spool 11 of the bait reel 10 further includes a dial knob 35 having a cam 35*a* mounted at the inside of the spool cover 110 in such a manner as to be coaxially rotated with the spool 11 having a spool shaft 11*a* rotatably supported against the outside of the body of the bait reel 10.

Additionally, the device of the present invention includes a magnetic braking means having a ring-shaped face plate 31 moved in a coaxial direction to the spool shaft 11*a* by the rotation of the cam 35*a* of the dial knob 35 rotated at the inside of the spool cover 110 covering the side face of the body of the bait reel 10 and a pair of movers 23 mounted on one end surface of the spool 11 to face each other about the spool shaft 11*a* in such a manner as to slidingly move in a radial direction, each of the pair of movers 23 having a plurality of magnets 23*a* mounted therein.

The magnetic braking means includes: a guide block 25 coupled to the spool shaft 11*a* in such a manner as to be rotated together with the spool 11 and having a pair of movers 23 elastically supported in such a manner as to be slidingly movable along slide grooves formed to face each other in the radial direction about the spool shaft 11*a*; the ring-shaped face plate 31 disposed at the outside of the guide block 25 in such a manner as to be moved forwardly and backwardly to/from the pair of movers 23 so as to selectively restrict the rotation of the spool 11 on which the pair of movers 23 are disposed, when the pair of movers 23 are moved in the radial direction by the generation of the centrifugal force caused by the rotation thereof; the dial knob 35 having the cam 35*a* adapted to forwardly and backwardly move the ring-shaped face plate 31; and a cover block 33 having a plurality of through-holes 33*a* formed thereon, through which the ring-shaped face plate 31 is coupled in such a manner as to be moved forwardly and backwardly by means of the cam 35*a* of the dial knob 35.

Also, a reference numeral 13 denotes the side face of the body of the bait reel 10, and so as to cover the spool cover 110 on the side face 13 of the body of the bait reel 10, when the spool cover 110 is rotated about the spool shaft 11*a* protruded toward the side of the body of the bait reel 10, the main components in the device for preventing the backlash on the spool of the bait reel according to the present invention include a support plate 21 supportedly mounted on one end surface of the spool 11 rotated cooperatively with the spool shaft 11*a*, the pair of movers 23 each having the plurality of magnets 23*a*, and the guide block 25 adapted to guide the sliding movement of the pair of movers 23 and to cover the pair of movers 23.

Further, the ring-shaped face plate 31 is mounted at the outside of the guide block 25 in such a manner as to be moved relative to the pair of movers 23. The ring-shaped face plate 31 is forwardly and backwardly moved in the interior of the cylindrical cover block 33 screw-coupled to the spool cover 110 and has a plurality of driven protrusions 31*a* formed integrally therewith in such a manner as to be partially contacted with the cam 35*a* through the through-holes 33*a* of the cover block 33, thereby being forwardly and backwardly moved by means of the cam 35*a* of the dial knob 35 rotatably supported on the spool cover 110.

On the other hand, reference numerals 41 and 43 denote a second restoring spring and a guide ring adapted to apply an elastic force to the ring-shaped face plate 31 such that the ring-shaped face plate 31 is moved and restored to its original position, and a reference numeral 25*a* denotes a window adapted to allow the magnets 23*a* of the pair of movers 23 to be exposed to the outside.

By means of the increase and decrease of the electromagnetic force caused by the pair of movers 23 moved relatively to the ring-shaped face plate 31, the plurality of magnets 23*a* embedded in the pair of movers 23 become near the ring-shaped face plate 31 to cause a high magnetic force therefrom upon the initial step of casting at which the rotary force of the spool 11 is strong, thereby generating a predetermined brake force for the rotation of the spool 11. Contrarily, upon the finishing step of casting at which the rotary force of the spool 11 is weak, the pair of movers 23 are restored and moved by means of a plurality of restoring springs 17 elastically supported between the outside of the pair of movers 23 and the inside of the guide block 25 and are escaped from the range of the application of the magnetic force to the ring-shaped face plate 31, thereby automatically removing the brake force therefrom.

As mentioned above, the pair of movers 23 are reciprocally moved as the centrifugal force applied to the pair of movers 23 is increased and decreased according to the increase and decrease of the rotary force of the spool 11, the pair of movers 23 are operated cooperatively proportionally according to the variation of the rotary force of the spool 11 upon the casting, such that if the rotary force of the spool 11 is a predetermined value or less, the brake force is automatically removed, thereby achieving the expansion of distance and preventing the backlash from occurring on the spool 11.

As described above, the device for preventing backlash on the spool of the bait reel according to the present invention is operated proportionally according to the variation of the rotary force of the spool when a fishing line wound on the spool of the bait reel is cast in the water, such that if the rotary force of the spool is a predetermined value or less, a braking force is removed, thereby achieving the expansion of distance preventing the backlash from occurring on the spool, and enhancing a user's conveniences during the fishing.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A bait reel comprising:
   a rotatable spool on which fishing line may be wound;
   a spool shaft associated with the spool and rotatable with the spool; and a magnetic brake device including a ring-shaped plate, a guide block positioned between the spool and the plate and coupled to the spool shaft such that the guide block is rotatable with the spool, a pair of movers positioned in the guide block and movable radially with respect to the guide block, and at least one magnet mounted on each of the movers, wherein the guide block extends between the magnets and the plate and has at least one window for exposing the magnets to the plate, and wherein the plate cooperates with the magnets to generate a brake force on the spool when the movers are moved radially by the generation of centrifugal force caused by rotation of the spool.

2. The reel of claim 1 wherein the plate is axially movable with respect to the spool shaft, and wherein the reel further comprises a rotatable dial knob having a cam that causes the plate to move axially toward or away from the movers.

3. The reel of claim 1 wherein the plate has a protrusion that contacts the cam, and wherein the reel further comprises a cover block disposed between the dial knob and the plate, the cover block having a through hole that receives the protrusion of the plate.

4. A bait reel comprising:
 a rotatable spool on which fishing line may be wound and from which the line may be unwound during a casting event;
 a spool shaft associated with the spool and rotatable with the spool;
 a magnetic brake device including a ring-shaped plate having multiple protrusions, a guide block positioned between the spool and the plate and coupled to the spool shaft such that the guide block is rotatable with the spool, a pair of movers slidably received in the guide block and movable radially with respect to the guide block, multiple magnets mounted on each mover, and multiple restoring springs disposed between the movers and the guide block for urging the movers radially inward, wherein the guide block extends between the magnets and the plate and has a pair of windows for exposing the magnets to the plate, and wherein the movers are configured to move radially outward during an initial stage of the casting event such that the magnets cooperate with the plate to generate a predetermined brake force on the spool, and the movers are configured to move radially inward during a finishing stage of the casting event so as to remove the braking force from the spool;
 a rotatable dial knob having a cam that contacts the protrusions of the plate such that rotation of the dial knob causes the plate to move axially with respect to the spool shaft; and
 a cover block disposed between the dial knob and the plate, the cover block having multiple through holes that receive the protrusions of the plate.

* * * * *